United States Patent [19]
Naim

[11] Patent Number: 5,727,913
[45] Date of Patent: Mar. 17, 1998

[54] DOUBLE EDGE TRIMMING TOOL

[76] Inventor: Moshe Naim, 15 Hashkedim Street, 15241 Kfar Tavor, Israel

[21] Appl. No.: 653,032

[22] Filed: May 24, 1996

[51] Int. Cl.[6] ........................................ B23C 9/00
[52] U.S. Cl. ........................ 409/138; 407/31; 409/180; 409/213; 409/234
[58] Field of Search .................. 30/289, 293; 83/508.3, 83/425.4; 407/31; 144/154.5, 135.2, 145.3, 134.1, 137; 408/191, 193, 224; 409/138, 175, 180, 213, 217, 232, 234, 178

[56] References Cited

U.S. PATENT DOCUMENTS

| 1,225,113 | 5/1917 | Davie | 407/31 |
|---|---|---|---|
| 1,729,286 | 9/1929 | Elfring | 407/31 |
| 2,644,348 | 7/1953 | Castle | 408/110 |
| 3,642,040 | 2/1972 | Brandt | 144/139 |
| 4,359,303 | 11/1982 | Bragaglia | 409/303 |
| 4,960,352 | 10/1990 | Kishi | 144/154.5 |
| 5,154,553 | 10/1992 | Baumstark | 407/31 |
| 5,352,072 | 10/1994 | Velepec | 144/145.3 |
| 5,468,100 | 11/1995 | Naim | 409/234 |

FOREIGN PATENT DOCUMENTS

| 2436810 | 2/1976 | Germany | 409/234 |
|---|---|---|---|
| 2905335 | 8/1979 | Germany | 407/31 |

*Primary Examiner*—Daniel W. Howell
*Assistant Examiner*—Christopher Kirkman
*Attorney, Agent, or Firm*—Mark M. Friedman

[57] ABSTRACT

A tool for simultaneously machining two opposing edges of the end face of a horizontal plate is disclosed. The tool comprises two machining means, rotatable about a vertical axis; the lower machining means is at a fixed vertical position, while the vertical position of the upper machining means varies in conformance with the top surface of the plate, by being part of a vertically sliding subassembly that comprises one or more rollers and means to press the subassembly downward so that the rollers continuously touch the top surface of the plate.

6 Claims, 7 Drawing Sheets

DOUBLE EDGE TRIMMING TOOL

FIELD AND BACKGROUND OF THE INVENTION

The present invention relates to a rotating machining tool and, more particularly, to a tool that trims both edges of a narrow laminate strip bonded to the end face of a plate.

In the industrial process of laminating a flat plate of wood or similar structural material with a synthetic laminate, such as FORMICA, the end surfaces of the plate are usually laminated last. For example, the two faces of a stock-sized plate may be laminated first, then the plate is sawed into parts of desired sizes and finally the end surfaces of each part (to be referred to herebelow as a plate) are laminated. The laminate serving for this last step is supplied as a long strip, whose width is equal to, or slightly exceeds, the thickness of the face-laminated plate, i.e. of the combined thickness of the core wood plate and the two laminates attached to its faces. The relation between the components after bonding is depicted in the cross-sectional view of FIG. 6A, which shows only the portion of a plate near one end surface. As is clearly seen, the core plate 12 has a laminate layer 14 bonded to each of its two faces 13. The strip of laminate 16 (whose long dimension is perpendicular to the plane of drawing) is bonded to the end surface 15 of the core plate 12, as well as to the ends of the two laminate layers 14. The width of the strip 16, marked as W, needs to be at least equal to the combined thickness, marked as T, of the core plate 12 and the two layers 14. In practice, W is made slightly greater than T, in order to insure that the ends of the layers 14 are always covered by the strip 16, in spite of variations in its position during bonding and in spite of variations in the thickness of the plate. After completion of bonding of the strip, the access of its width, W, over the actual plate thickness, T, (that is, the protrusions of the strip beyond the outer surfaces of the laminated plate) must be trimmed away—for both aesthetic reasons and durability considerations. Usually the edges of the strip are trimmed at some angle, typically 9–15 degrees, with respect to the faces of the plate, leaving each edge beveled, as depicted in FIG. 6B.

The trimming is generally carried out by a rotating tool, such as a router. Usually the plate lies on a horizontal bench, with the end to be trimmed exposed, and is moved in a direction parallel to the end surface; the tool, with a vertical axis of rotation, is positioned below the plate so that the top edge of its cutting bit is aligned with the bottom surface of the plate. While the plate moves, the top edge of the bit nibbles at the lower protruding edge of the strip. Eventually the plate is turned over and the opposite edge of the strip is trimmed in the same manner. While it is possible, in principle, to trim the upper edge without turning the plate over, by placing the tool inverted above the plate, this mode is avoided in practice because slight variations in the thickness of the plate would cause variations in the trimline, perhaps even cutting into the upper surface of the top laminate. Another possibility is to provide a tool with two, oppositely facing, bit assemblies, the distance between them set to the thickness of the plate, so as to trim both edges of the strip simultaneously and thus double the processing speed. Such a tool, in a convenient configuration, is described, for example in U.S. Pat. No. 5,468,100. This, again, is not practical for the same reason given above with respect to the single top edge trimming tool, namely the slight thickness variations of the plate causing varying depth of trim.

The objections to trimming the top edge of the laminate strip may be overcome when the tool (or router) is part of a digitally (or numerically) controlled machine. In this case, a position sensor may be placed in contact with the top surface of the plate near the trimming tool, so as to accurately and continuously sense the height of that surface and feed this information to a computer, which in turn controls the vertical position of the tool so as to follow the vertical position of the top surface of the plate. In such a machine it is, of course, also possible to simultaneously deploy two trimming tools—one for the bottom edge of the plate and one (under control of vertical position as described above) for the top edge of the plate. The disadvantage of such a machine is its high cost, which precludes it from many small shops. Moreover, in small shops it may be economically desirable to combine the trimming operation with the end lamination process; that is, the trimming tool would preferably be placed on the same plate transporting machine on which lamination takes place, so that trimming follows the bonding step. In such an arrangement, there is even further economy to be gained from trimming both edges simultaneously.

There is thus a widely recognized need for, and it would be highly advantageous to have, an inexpensive edge trimming tool that can simultaneously trim both edges of the end face of a laminated plate in spite of thickness variations of the plate.

SUMMARY OF THE INVENTION

The present invention discloses a novel tool for simultaneously machining both edges of the end face of a plate. More specifically, the tool of the present invention economically enables simultaneous trimming of both edges of a strip of laminate bonded to the end face of a wood plate or therealike, keeping the depth of trimming constant in spite of variations in the thickness of the plate.

The present invention successfully addresses the shortcomings of the presently known configurations by providing a trimming tool with two rotating trimmers, the upper one of which is free to move vertically and is mechanically coupled to a pair of rollers that ride over the top face of the plate, thus causing the trimmer to follow the vertical variations of that face.

According to the present invention there is provided a tool for simultaneously machining two opposing edges of the end face of a horizontal plate, comprising two machining means, one above the other, rotatable about a vertical axis; the lower machining means, operational on the lower edge of the face, is at a fixed vertical position, while the vertical position of the upper machining means, operational on the upper edge of the face, varies in conformance with the vertical position of the near portion of the top surface of the plate.

According to further features in preferred embodiments of the invention described below, the upper machining means is rotationally held by a bearing in a riding subassembly, the riding subassembly also comprising one or more rollers with horizontal axes perpendicular to the end face and means to press the riding subassembly downward so that the rollers continuously touch the top surface of the plate.

According to still further features in the described preferred embodiments, rotation is imparted to the machining means through a rotating central member, the upper portion of which is formed into a shaft; the lower machining means is rigidly attached to the central member and the upper machining means is slidable lengthwise the shaft; a groove cut lengthwise the shaft and a pin engaging the groove and extending radially through a hole in the upper machining means prevent mutual rotation therebetween.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a tool that can simultaneously machine both edges of the end face of a plate. Specifically, the present invention can be economically used to simultaneously trim both edges of a strip of laminate bonded to the end face of a wood plate or therealike, keeping the depth of trimming constant in spite of variations in the thickness of the plate.

The principles and operation of a trimming tool according to the present invention may be better understood with reference to the drawings and the accompanying description.

Figure 1:
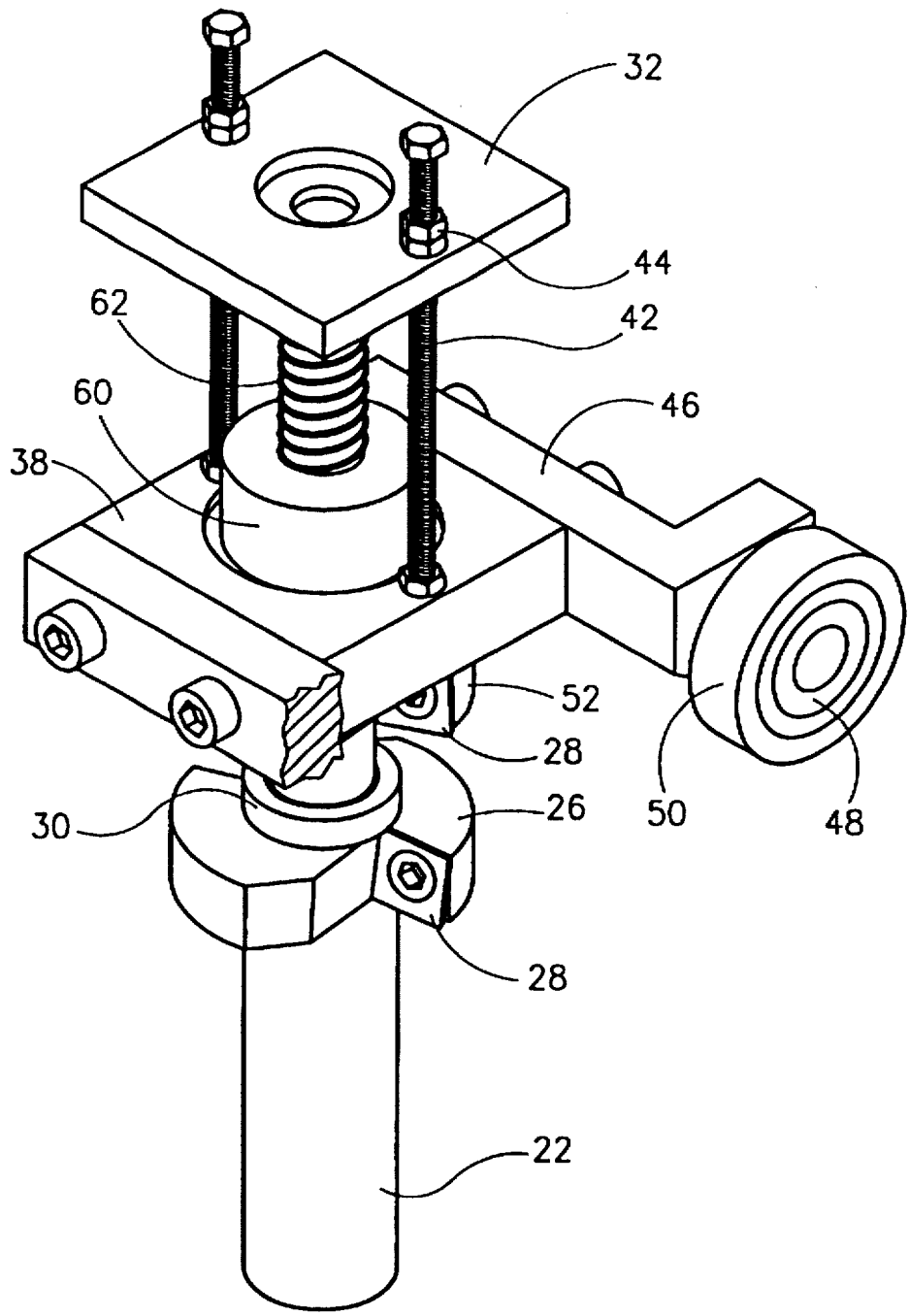
FIG. 1 is an isometric drawing of the complete tool according to the invention.
Figure 2:
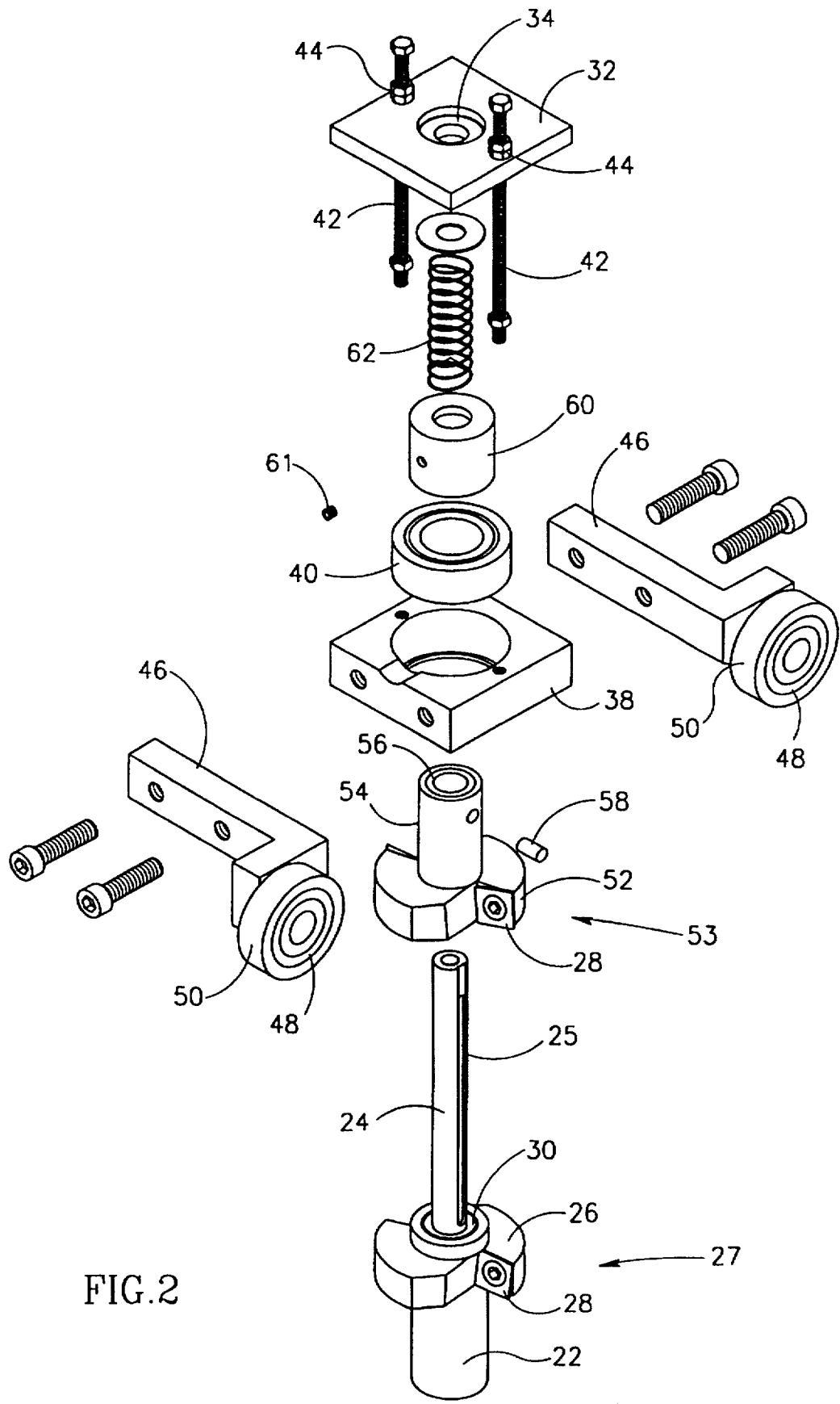
FIG. 2 is an exploded isometric drawing of the complete tool.

Referring now to the drawings, FIGS. 1 and 2 illustrate the complete tool in isometric projection, whereby FIG. 1 shows it fully assembled, while FIG. 2 shows it disassembled in an exploded view. The tool consists of two main subassemblies, to be termed the basic subassembly and the riding subassembly, respectively. Each subassembly consists of a fixed component and a rotating component.

The rotating component of the basic subassembly comprises a long member that consists of the following parts, all preferably made of steel, rigidly attached to one another and centered about the axis of rotation: The lower part of the member is a cylindrical shank 22 such that can be held by a chuck connected to the rotor of a driving motor. The upper part of the member is a shaft 24, with a groove 25 cut into it over most of its length and parallel to its axis. At the joint of the shank and the shaft is lower bit holder 26, which has one or more faces in radial planes. A trimming bit 28 is attached to each such radial face by a screw; the upper, cutting edge of each bit is at a small negative angle to the horizontal. The bit holder 26 and the attached bits 28 will be referred to as the lower trimmer 27. Mounted on the shaft 24, near its lower end, is a ball bearing that is surrounded by a ring 30 with a smooth cylindrical outer surface; the ring 30 could also be the outer member of the ball bearing itself. As will be explained herebelow, the outer surface of ring 30 determines the lateral position of the face of the workpiece being trimmed with respect to the tool; therefore its radius is selected to have the correct value with respect to the radial position and extent of the upper edge of bit 28.

The fixed component of the basic subassembly consists of a fixed plate 32, having a hole at its center, into which is press-fitted a ball bearing 34. The ball bearing 34, in turn, is mounted over the end of shaft 24 and press-fitted thereto.

The fixed component of the riding subassembly comprises a riding plate 38, having a hole at its center, into which is press-fitted a ball bearing 40. To the top surface of the riding plate 38 and perpendicularly thereto are attached two (or more) long bolts 42. The top portions of the bolts 42 protrude through matchingly placed clearance holes in the fixed plate 32 and onto these portions of the bolts are screwed lockable nuts 44, so as to be prevented from sinking below the top face of the fixed plate 32. It is noted that the bolts also keep the fixed plate from rotating relative to the bottom plate. Attached to each of two opposite end faces of the riding plate 38, by means of two screws, is a right-angled bracket 46. To the other leg of each bracket 46 is attached the inner member of a ball bearing 48. The outer member of ball bearing 48 is surrounded by a smooth-surfaced roller 50 (which may be the outer member itself or a ring fitted around it). The two ball bearings 48 are attached so that outer surfaces of rollers 50, at their lowest portion, extend a certain distance below the riding plate 38. Please note that in FIG. 1, only one set of bracket and roller is fully shown; only a part of the other bracket is shown, in order not to obstruct the view.

Figure 3A:
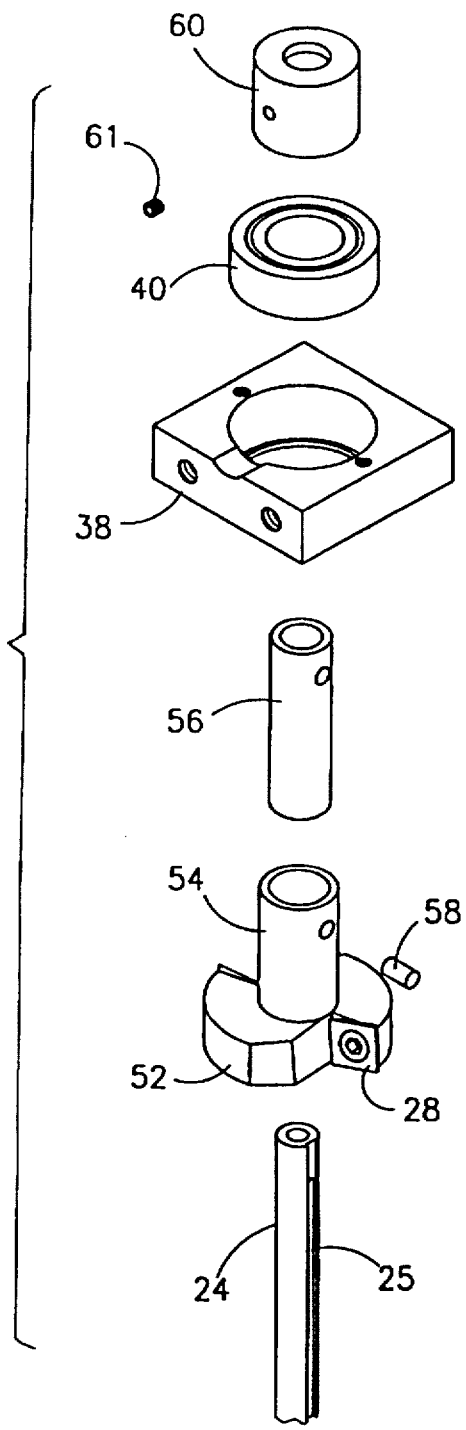
FIG. 3A is an exploded isometric drawing of the rotating component of the riding subassembly
Figure 3B:
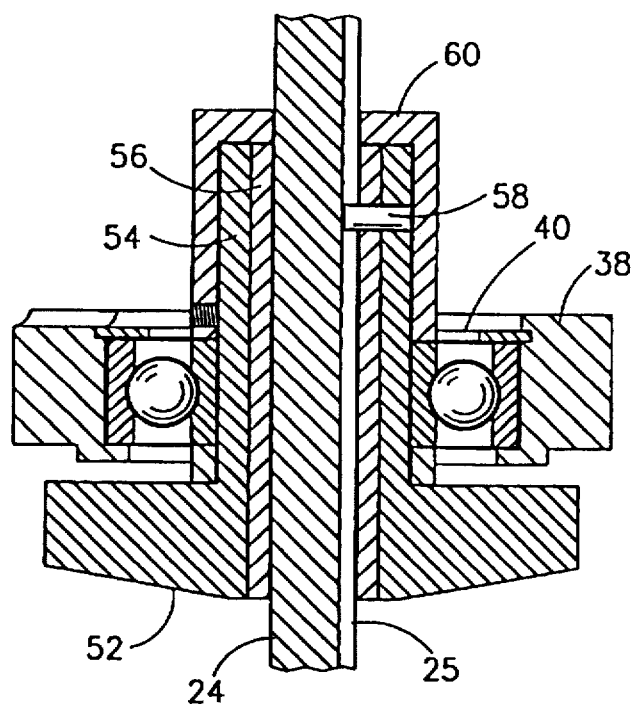
FIG. 3B is a cross-sectional drawing of the rotating component of the riding subassembly
Figure 4A:
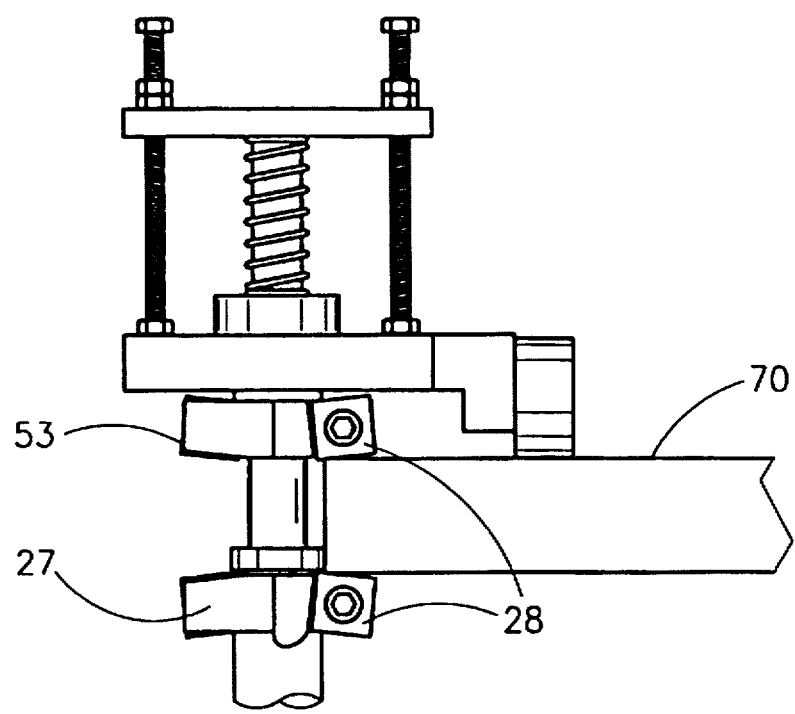
FIG. 4A is a side view of the tool illustrating its operation.
Figure 4B:
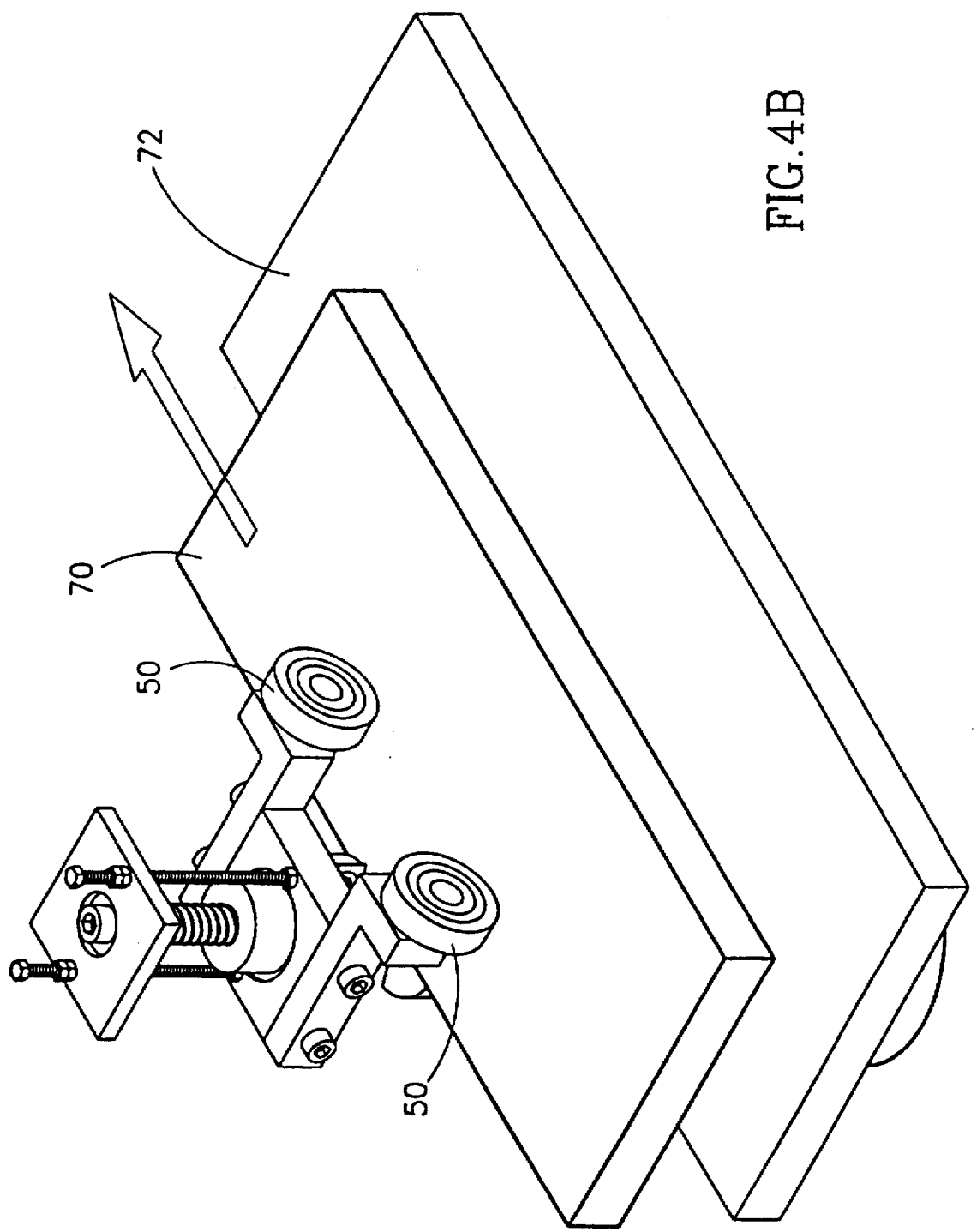
FIG. 4B is an isometric drawing of the tool, illustrating its operation.

The rotating component of the riding subassembly comprises the following parts. Some of these parts are also shown in the detail drawings of FIG. 3, where FIG. 3A is an isometric exploded view and FIG. 3B is a cross-sectional view. There is provided an upper bit holder 52, to which are attached trimming bits 28 in identical radial positions as, and in a manner similar to, those of the lower trimmer, as described hereabove, except that the cutting edge of the bit, which in this case is the lower edge, is at a positive small angle to the horizontal. The bit holder 52 is formed to also have a short tubular section 54 protruding upward; the axial hole through the tubular section extends through the entire bit holder. The bit holder 52 and the attached bits 28 will be referred to as the upper trimmer 53. The tubular section 54 extends through the inner member of ball bearing 40. Inside the axial hole through the bit holder 52 is a bushing 56, which slidingly fits over the shaft 24 of the basic subassembly. A pin 58 extends through matching holes in the bushing 56 and the tubular section 54 into the groove 25; its external end is flush with the outer surface of the tubular section. A cap 60 is placed over and around the tubular section 54, above the roller bearing 40, and attached thereto by a set screw 61; the cap keeps the pin 58 in place; a clearance hole through the top of the cap allows the shaft 24 to extend through it. It is noted that the upper trimmer 53 is thus rotatable with respect to the riding plate 38. It is also noted that the pin 58, by engaging the groove 25, causes the upper trimmer (and the whole rotating component of the riding subassembly) to be rotationally coupled to the rotational component of the basic subassembly; at the same time, the bushing 56 enables the upper trimmer (and the whole riding subassembly) to be slidable in a direction parallel to the axis of rotation, i.e. vertically. Pressed between cap 60 and the inner member of roller bearing 34 in the fixed plate 32 and also surrounding shaft 24, there is a spring 62, possibly terminated by washers. It is noted that the spring 62 acts to push the riding subassembly downward as far as the nuts 44 on bolts 42, stopped by fixed plate 32, will allow. It is noted that the vertical position of the upper bit holder 52 with respect to cap 60 (and therefore also with respect to the rest of the riding subassembly) is adjustable and setable by the set screw 61.

Operation of the tool will now be described with reference to FIGS. 1, 2, 4A and 4B. The latter two show the tool, in side- and isometric projection, respectively, with a workpiece plate 70 in place to be edge trimmed. The tool is held by shank 22 in the chuck of a drive motor (not shown) mounted below the workbench 72 and protrudes above the workbench through a hole therethrough. Two adjustments are undertaken infrequently—preferably after changing or adjusting the trimming bits: The first adjustment is to vertically position the shank 22 with respect to the chuck so that the cutting, upper edges of bits 28 of lower trimmer 27 are correctly vertically aligned with the top surface of the workbench 72 (and thus—with the bottom surface of the workpiece plate 70). The second adjustment is to vertically position upper trimmer 53 with respect to cap 60 (while set screw 61 is loose) so that the cutting, lower edges of its bits 28 are correctly vertically aligned with the lowest points of rollers 50; as will be explained herebelow, this aligns the cutting edges with the top surface of the workpiece plate 70. Before beginning work on a workpiece having a thickness different from those preceding it, the nuts 44 on bolts 22 are turned, raising or lowering the riding subassembly (by the pushing action of the spring 62) until the lowest points of the cylindrical surfaces 50 are slightly, say a few millimeters, below the top surface of the new workpiece; in other words, the distance between surfaces 50 and the top of the workbench is made to be slightly less than the thickness of the workpiece.

The workpiece plate 70 is placed on the workbench 72 and made to travel in the direction of the arrow (FIG. 4B) while being pressed down against the workbench, as well as laterally against a guide and the outer surface of ring 30. The latter may thus serve as part of the guide 15 or it may be flexibly pushed against the end face of the plate, by mounting the tool on a laterally movable and spring-loaded jig. Alternatively, the ring 30 may be dispensed with and the tool rigidly mounted at a proper lateral relation to the guide. When the leading edge of the plate reaches the first of the rollers 50, it acts to raise the roller and, through it, the whole riding subassembly, against the push of spring 62. Thereafter the two rollers are kept pressed against the top surface of the plate, by the pushing action of the spring, until the trailing edge of the plate has left the last of the two rollers. Any variation in the thickness of the plate thus causes the rollers, and with them (through the riding subassembly)—the upper trimmer, to move vertically in conformity with the top surface of the plate. It is noted that this vertical motion is enabled by the bushing 56 sliding along shaft 24, while pin 58 slides along groove 25. It is appreciated that, while rollers are preferably used for keeping contact with the moving plate, any hard-surfaced contacting means could be used instead.

Meanwhile the rotating components of the tool rotate, by the action of the drive motor; in particular, both trimmers rotate and thus act to trim the edges of the end laminate of the workpiece. As has been noted, while the rollers 50 vertically follow the top surface of the workpiece, the upper trimmer 53 undergoes exactly the same vertical motion; therefore its trimming path remains essentially at a constant vertical relation to the top surface. It is appreciated that the depth of trimming is thus kept constant, minimizing over- and under-cuts, in general, and avoiding gouging of the top laminate, in particular. It is assumed that, owing to the pressure under which the plate is held onto the workbench, its bottom surface is kept essentially flat; therefore the depth of trimming effected by the lower trimmer 27, whose vertical position is fixed, is also essentially constant, as has been the case in operation of trimming tools of prior art, which comprise only a single, lower trimmer.

In one application the trimming tool is preferably placed on the same plate transporting machine on which lamination takes place, so that trimming follows the bonding step.

Figure 5A:
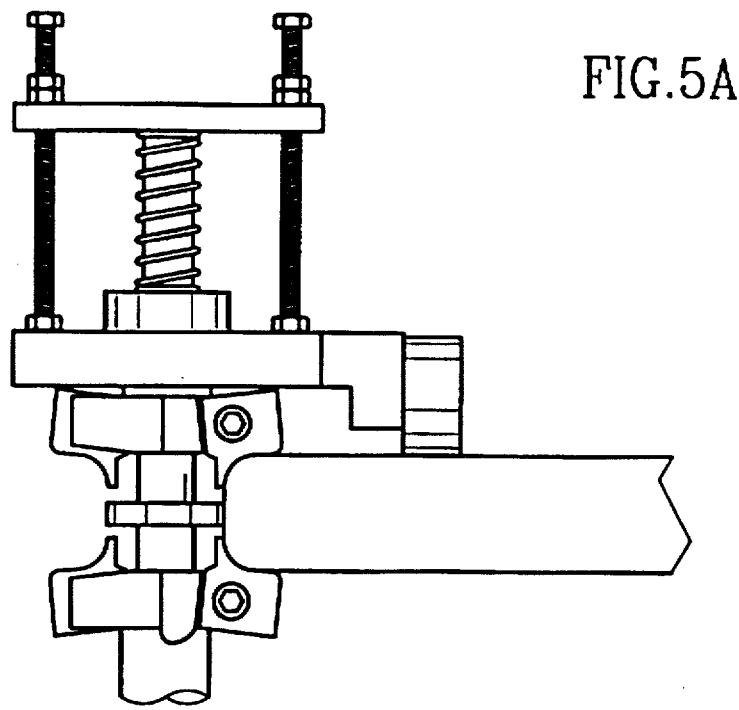
FIG. 5A is a side view of the tool in an alternative configuration.

Another possible configuration of the tool according to the present invention is shown as a side projection in FIG. 5A. The tool is essentially identical to the configuration described above, except that the trimming bits are replaced by shaping bits. This configuration may serve to shape the edges of plates made of wood or similar materials.

Figure 5B:
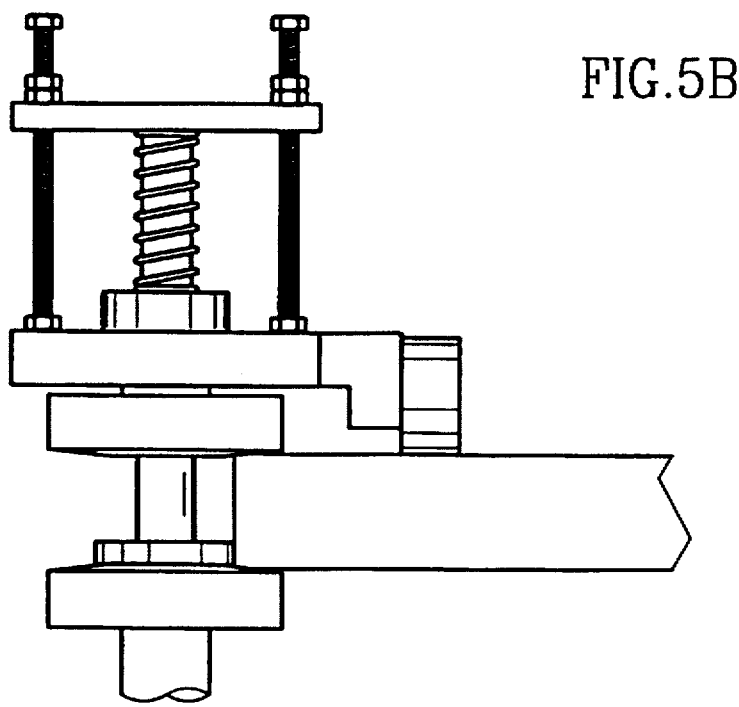
FIG. 5B is a side view of the tool in another alternative configuration.
Figure 6A:
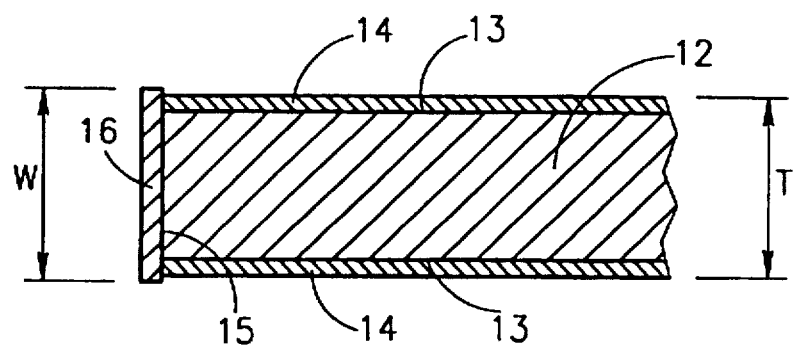
FIG. 6A is a cross-sectional view of a typical workpiece prior to trimming
Figure 6B:
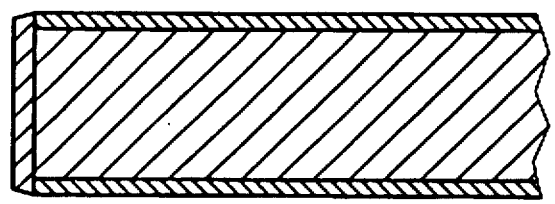
FIG. 6B is a cross-sectional view of the workpiece of FIG. 6A after trimming

Yet another configuration of the present invention is shown in FIG. 5B. It is similar to the previously described configurations, except that the trimmers are not shaped to hold bits. Rather, they are shaped to hold a grinding- or sanding layer on one of their surfaces; this surface is the bottom surface, in the case of the upper trimmer, and the top surface—in the case of the lower trimmer. Each surface has a shallow conical profile. A tool of this configuration serves to grind or sand edges of a workpiece plate—in a manner similar to that described hereabove.

It is appreciated that, by variously forming the trimmers and equipping them with various cutting- or material-working means, the tool can serve for a large variety of edge machining applications, whereby the tool is characterized by the ability to simultaneously and accurately machine both opposing edges of the end face of a plate in spite of variations in the thickness of the plate.

While the invention has been described with respect to a limited number of embodiments, it will be appreciated that many variations, modifications and other applications of the invention may be made.

What is claimed is:

1. A tool for simultaneously machining two opposing edges of an end face of a plate, the two edges being associated with a top face and a bottom face of the plate, respectively, the tool comprising:

(a) two rotatable machining means, each of said machining means positioned to machine a respective one of opposing edges wherein the bottom face of the plate is held in close contact with a planar top surface of a table and said two machining means rotate about an axis substantially perpendicular to said top surface of said table and wherein a first one of said two machining means is at a fixed position, such that said first machining means machines the edge that corresponds to the bottom face of the plate, and the axial position of a second one of said machining means varies in conformance with the position of a portion of the top surface of the plate nearest said second machining means along a direction parallel to said axis;

(b) a riding subassembly, said riding subassembly including a bearing, for rotationally holding said second one of said machining means, one or more contacting means and means for pressing said riding subassembly toward the plate so that said contacting means continuously touches said top surface of the plate; and (c) a rotating central member for imparting rotation to both of said machining means, a portion of said central member being formed into a shaft, the first one of said machining means being rigidly attached to said central member and the second one of said machining means being slidable along said shaft, said second one of said machining means and said shaft being provided with means for preventing mutual rotation therebetween.

2. The tool of claim 1, wherein said means for preventing mutual rotation includes a groove formed in said shaft parallel to its axis, a hole drilled radially through said upper one of said machining means and a pin extending radially through said hole and engaging said groove.

3. The tool of claim 1, further comprising means for limiting the position of said riding subassembly nearest said table to a point nearer said table than that assumed when said contacting means touches said top surface.

4. The tool of claim 1, wherein said means for pressing includes a coiled spring disposed around said shaft.

5. The tool of claim 1, wherein said two machining means are edge trimmers.

6. The tool of claim 1, wherein said contacting means includes rollers having axes perpendicular to the end face.

* * * * *